United States Patent [19]

Simon et al.

[11] 4,405,590

[45] Sep. 20, 1983

[54] DISMUTATION/REDISTRIBUTION OF HALOGENOSILANES INTO SILANE

[75] Inventors: Gerard Simon; Andre Soldat, both of Villeurbanne, France

[73] Assignee: Rhone-Poulenc Specialites Chimiques, Courbevoie, France

[21] Appl. No.: 358,387

[22] Filed: Mar. 15, 1982

[30] Foreign Application Priority Data

Apr. 3, 1981 [FR] France .................................. 81 06710

[51] Int. Cl.$^3$ .............................................. C01B 33/04
[52] U.S. Cl. ...................................... 423/347; 423/341; 423/342; 556/469
[58] Field of Search ....................... 423/347, 342, 341; 556/469

[56] References Cited

U.S. PATENT DOCUMENTS

| | | | |
|---|---|---|---|
| 3,968,199 | 7/1976 | Bakay | 423/347 |
| 4,018,871 | 4/1977 | Marin et al. | 423/342 |
| 4,038,371 | 7/1977 | Marin et al. | 423/342 |

*Primary Examiner*—Jack Cooper
*Attorney, Agent, or Firm*—Burns, Doane, Swecker & Mathis

[57] ABSTRACT

The dismutation/redistribution of halogenosilanes into silane is carried out by contacting at least one halogenosilane comprising at least one Si-H function with a compound comprising at least one α-oxoamine group, then by contacting the products of such reaction with a compound also comprising at least one α-oxoamine group, to selectively dissolve all products of reaction except for the silane therein, and then separating the desired silane therefrom.

10 Claims, No Drawings

DISMUTATION/REDISTRIBUTION OF HALOGENOSILANES INTO SILANE

BACKGROUND OF THE INVENTION

1. Field of the Invention

The present invention relates to the preparation of silane, and, more especially, to the preparation of silane from halogenosilanes.

2. Description of the Prior Art

It is of course well known to this art that silane constitutes a preferred starting material for the preparation, by decomposition, of silicon which is particularly useful for the fabrication of semiconductor devices or photovoltaic devices (solar cells).

It too is known to this art that it is possible to obtain silane by the dismutation of trichlorosilane in the presence of various catalysts, according to the following equilibrium reactions:

$$2HSiCl_3 \rightleftharpoons H_2SiCl_2 + SiCl_4 \tag{1}$$

$$2H_2SiCl_2 \rightleftharpoons HSiCl_3 + H_3SiCl \tag{2}$$

$$2H_3SiCl \rightleftharpoons SiH_4 + SiCl_2 \tag{3}$$

namely, on an overall basis:

$$4HSiCl_3 \rightleftharpoons SiH_4 + 3SiCl_4. \tag{4}$$

Thus, according to French Pat. No. 2,261,977, it has been proposed to produce silane by the dismutation reaction or redistribution reaction of $HSiCl_3$ in a bed of solid anion-exchange resin, at a sufficient temperature to cause the reaction products of lower boiling point to vaporize out of the reaction zone, and to cause the liquid reaction product of higher boiling point, $SiCl_4$, to condense and to flow away from the reaction zone. The temperature at the top of the bed is maintained at a value above the boiling point of $SiH_4$ and below the boiling point of $H_3SiCl$, and $SiH_4$ containing small amounts of hydrogenochlorosilanes, which require subsequent separation, is recovered from the bed.

This particular process, which is extremely complicated and difficult to carry out, either involves the continuous distillation of the products of the various equilibrium reactions (1), (2) and (3) and permits a degree of separation of the various products present, or involves the purification of $SiH_4$ on a charcoal trap.

Furthermore, differemt processes are also known for the preparation of dichlorosilane by the dismutation of trichlorosilane in the presence of various catalysts. In this dismutation according to the aforesaid reaction (1), the other chlorinated silanes are also obtained in certain cases, in very low proportions, the yields of obtained dichlorosilane always being much greater than the yields of the other chlorosilanes. Among such catalysts heretofore known for this purpose, the following are particularly representative: tertiary amines of the general formula NR'R"R"', in which R', R" and R"' are identical or different alkyl radicals (French Pat. No. 1,111,925), amine hydrochlorides (French Pat. No. 2,096,605), N-substituted pyrrolidones (French Pat. No. 2,290,447) and tetraalkylureas (French Pat. No. 2,290,448). Cf. French Pat. No. 2,118,725.

SUMMARY OF THE INVENTION

Accordingly, a major object of the present invention is the provision of an improved process for the preparation of silane, one in which the silane is very readily obtained and with an excellent selectivity, without the requirement for a plurality of successive distillations, as in the process described in the aforenoted French Pat. No. 2,261,977.

Briefly, the subject process features contacting at least one halogenosilane with a compound containing at least one α-oxoamine group:

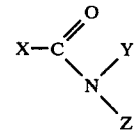

in order to effect the dismutation and/or the redistribution of the halogenosilane to yield silane, silicon tetrahalide and residual halogenosilanes, and then contacting such products again with said α-oxoamine compound in order to effect the separation of the silane from the other products of reaction.

DETAILED DESCRIPTION OF THE INVENTION

More particularly according to this invention, it has now surprisingly and wholly unexpectedly been determined that, on the one hand, the above α-oxoamine compounds enable obtainment of silane from a halogenosilane by dismutation and/or redistribution characterized by good selectivity, and that, on the other hand, these α-oxoamine compounds also effect the separation of the silane from the other reaction products by selective solvation of the latter.

Stated differently, and without wishing to be bound to any particular theory, it would appear that the topic α-oxoamines act both as the catalyst enabling the actual preparation of the silane, but also as the solvent for the other silicon compounds, thus permitting the very easy separation of the silane from such other compounds.

Thus, the present invention features a process for the preparation of silane, characterized in that the dismutation and/or the redistribution of a halogenosilane is carried out by contacting at least one halogenosilane containing at least one Si-H bond with a compound containing at least one α-oxoamine function, and also in that the silane formed is separated from the reaction mixture by contacting the products of reaction with said compound containing at least one α-oxoamine group.

The halogenosilanes containing at least one Si-H bond which are exemplary starting materials according to the process of this invention are, in particular, those having the formula $R_nH_mSiCl_{4-(n+m)}$, in which n can have the values 0, 1, 2 or 3 and m the values 1, 2 or 3, and R, if present, is an alkyl or aryl radical and preferably is one of the radicals: methyl, ethyl, propyl, isopropyl and phenyl. In a preferred embodiment of the invention, trichlorosilane, dichlorosilane, methyldichlorosilane, dimethylchlorosilane, phenyldichlorosilane or ethyldichlorosilane is employed as the starting material.

The compounds containing at least one α-oxoamine group which are envisaged consistent with the process of the invention have the structural formula:

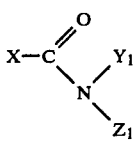

in which X is a hydrocarbon radical having from 1 to 10 carbon atoms, preferably an alkyl, aryl or cycloaliphatic radical, or one of the radicals

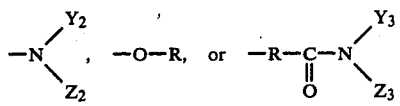

in which $Y_2$, $Z_2$, R, $Y_3$ and $Z_3$ are each a hydrocarbon radical having from 1 to 10 carbon atoms; $Y_1$ and $Z_1$ are each a hydrocarbon radical having from 1 to 10 carbon atoms, preferably an alkyl, aryl or cycloaliphatic radical, or an alkoxy radical having from 1 to 10 carbon atoms; with the proviso that $Y_1$ and $Z_1$, and $Y_2$ and $Z_2$, may together form a single divalent radical, and X and $Y_1$ and or $Z_1$ may likewise together form a single divalent radical when X is a hydrocarbon, and $X_3$ and $Z_3$ may likewise together form a single divalent radical.

Exemplary such compounds are the ureas, the diureas, the carbamates, the N-alkoxyamides, the tetraalkylureas and the N-substituted pyrrolidones.

Among such compounds, those of the following structural formulae are particularly representative:

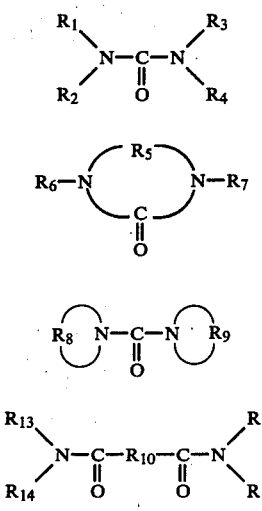

in which $R_n$, where n=1, 2, 3, 4, 5, 6, 7, 8, 9, 10, 11, 12, 13 or 14, are each a hydrocarbon radical having from 1 to 10 carbon atoms, preferably an alkyl, aryl or cycloaliphatic radical.

According to the process of the invention, it is preferred to use tetraalkylureas and N-substituted pyrrolidones.

The tetraalkylureas which are more preferably employed in the process of the invention correspond to the structural formula:

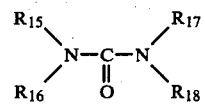

in which the radicals $R_{15}$, $R_{16}$, $R_{17}$ and $R_{18}$, which are identical or different, represent straight-chain or branched-chain alkyl radicals having from 1 to 6 carbon atoms. Among such compounds representative are tetramethylurea, tetraethylurea and tetrabutylurea.

The N-substituted pyrrolidones which are more preferably employed in the process of the invention correspond to the structural formula:

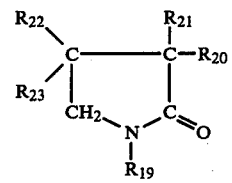

in which the radicals $R_{20}$, $R_{21}$, $R_{22}$ and $R_{23}$ which are identical or different, represent hydrogen or a methyl radical, and the radical $R_{19}$ represents a straight-chain or branched-chain alkyl or alkenyl radical containing from 1 to 6 carbon atoms, or a cyclohexyl or phenyl radical. Among such compounds, representative are N-methylpyrrolidone and N-ethylpyrrolidone.

The dismutation and/or the redistribution of the halogenosilane is effected by contacting the halogenosilane with the compound containing the at least one α-oxoamine group. This dismutation and/or redistribution gives rise to the formation of silane, silicon tetrahalide or an alkylhalogenosilane or arylhalogenosilane, and residual halogenosilanes.

Preferably, the molar ratio of the compound containing the at least one α-oxoamine group to the halogenosilane range from 2 to 1/50 and preferably ranges from ½ to 1/20.

According to the invention, it is envisaged to carry out the dismutation and/or the redistribution of pure halogenosilanes, or a mixture of halogenosilanes, if appropriate in the presence of silicon tetrachloride.

The dismutation and/or redistribution of the halogenosilane is carried out at a temperature ranging from −30° to 300° C., depending upon the chlorosilane and the catalyst employed, and preferably ranging from 0° C. to 100° C., and under a pressure which is less than, equal to or greater than atmospheric pressure.

Also according to the invention, as the silane is being formed by dismutation and/or redistribution, it is separated from the other reaction products by contacting said reaction products with the compound containing at least one α-oxoamine group; the said compound then selectively solvates the various products, except for the silane, and thus makes it possible to separate the latter in an extremely simple and very efficient manner.

The temperature at which this separation is carried out must be such that the products other than the silane remain dissolved in the liquid phase. This temperature preferably ranges from −30° C. to 50° C.

Also according to the invention, it is possible to add a diluent, such as an aliphatic or aromatic hydrocarbon (cyclohexane, benzene, ortho-dichlorobenzene, toluene, or the like), to the compound containing the at least one α-oxoamine group.

The temperatures and the flow rates of the various products are adjusted such as to permit, on the one hand, the desired dismutation and/or redistribution reactions, and, on the other hand, the recovery of the silane.

The process according to the invention can, moreover, be carried out continuously or batchwise.

In a preferred embodiment, the process of the invention is carried out in a column, the halogenosilane being introduced at the bottom of the column, in liquid or gaseous form, into a zone having a temperature ranging from about −30° C. to about 200° C. and preferably from 0° C. to 100° C., while the compound containing the at least one α-oxoamine group is circulated countercurrently in the column, the same being fed into the top of such column. A temperature gradient ranging from about −50° to about 200° C. and preferably from −30° C. to 100° C. is maintained in the column. The temperature at the top of the column is such that the products other than $SiH_4$ remain dissolved in the liquid phase. This temperature preferably ranges from −30° C. to 50° C. Tetrahalogenosilane, residual halogenosilanes, the compound containing the at least one α-oxoamine group, and if appropriate the diluent, are collected at the bottom of the column. If desired, the compound containing the at least one α-oxoamine group and the optional solvent can easily be separated from the tetrahalogenosilane and the residual halogenosilanes by distillation, in order to recycle them to the top of the column. Furthermore, after separation, the tetrahalogenosilane can also be converted to halogenosilane and also recycled back into the process with the residual halogenosilanes.

The present invention thus constitutes a completely integrated process for readily preparing silane from halogenosilane.

In order to further illustrate the present invention and the advantages thereof, the following specific examples are given, it being understood that same are intended only as illustrative and in nowise limitative.

EXAMPLE 1

The reactor utilized consisted of a 1 liter round-bottomed flask surmounted by a tray column having a length of 800 mm and a diameter of 30 mm.

Dichlorosilane was introduced by being bubbled into the round-bottomed flask, which had previously been filled with 500 ml of tetramethylurea/ortho-dichlorobenzene mixture (volume ratio 50/50). Its flow rate was 74 g/hour. The tetramethylurea/ortho-dichlorobenzene mixture was introduced into the top of the column at a flow rate of 58.7 ml/hour. This mixture countercurrently circulated with the vapors rising in the column.

The temperature of the round-bottomed flask was maintained at 26° C. The temperature of the column was 26° C. at the bottom and −12° C. at the top.

The volume of the reaction mixture in the round-bottomed flask was maintained at 500 ml by continuous removal to a constant level. This liquid phase was periodically analyzed by gas phase chromotography.

The gas phase leaving at the top of the column was also analyzed by gas phase chromotography and its flow rate was measured. At equilibrium, the composition of the liquid phase removed was as follows (percentages by weight):

(i) $H_2SiCl_2$—23%
(ii) $HSiCl_3$—35%
(iii) $SiCl_4$—1%
(iv) Tetramethylurea—17%
(v) $C_6H_4Cl_2$—24%

The composition of the gas phase leaving the reactor was as follows (percentages by volume):

(i) $H_2$—2%
(ii) $SiH_4$—98%

This gas phase did not contain chlorosilanes. Its flow rate was 2.40 liters/hour.

These compositions correspond to a degree of conversion of $H_2SiCl_2$ of 51.6%, and the yield of silane was 75.4%, relative to $H_2SiCl_2$ converted.

EXAMPLE 2

$H_2SiCl_2$ and a tetramethylurea/ortho-dichlorobenzene mixture (50/50 by volume) were introduced into the same reactor as that described in Example 1, at identical flow rates, under analagous conditions.

The temperature of the round-bottomed flask was fixed at 36.5° C. The temperature of the column was 29° C. at the bottom and −11° C. at the top thereof.

At equilibrium, the composition of the liquid phase removed was as follows:

(i) $H_2SiCl_2$—16%
(ii) $HSiCl_3$—33%
(iii) $SiCl_4$—1%
(iv) Tetramethylurea—21%
(v) $C_6H_4Cl_2$—29%

The composition of the gas phase leaving the reactor was as follows:

(i) $H_2$—4%
(ii) $SiH_4$—96%

Its flow rate was 3.16 liters/hour.

These compositions correspond to a degree of conversion of $H_2SiCl_2$ of 71.3%, and the yield of silane was 70.2%, relative to $H_2SiCl_2$ converted.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A Process for the dismutation and/or redistribution of at least one halogenosilane comprising at least one Si-H function into silane, which comprises contacting said at least one halogenosilane with a compound comprising at least one α-oxoamine group at a temperature ranging from −30° to 300° C. to effect dismutation and/or redistribution of the halogenosilane to thereby yield silane, silicon tetrahalide or an alkylhalogenosilane or arylhalogenosilane, and residual halogenosilanes, then separating the silane formed by maintaining the reaction products produced in the dismutation and/or redistribution in contact with the compound comprising at least one α-oxoamine group at a temperature at which the reaction products other than silane remain dissolved in said compound comprising at least one α-oxoamine group, and then collecting the separated silane.

2. The process as defined by claim 1, said compound comprising at least one α-oxoamine group having the structural formula:

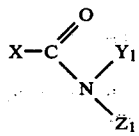

in which X is a hydrocarbon radical having from 1 to 10 carbon atoms, or one of the radicals

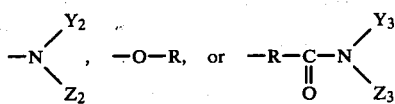

in which $Y_2$, $Z_2$, R, $Y_3$ and $Z_3$ are each a hydrocarbon radical having from 1 to 10 carbon atoms; $Y_1$ and $Z_1$ are each a hydrocarbon radical having from 1 to 10 carbon atoms, or an alkoxy radical having from 1 to 10 carbon atoms; with the proviso that $Y_1$ and $Z_1$, and $Y_2$ and $Z_2$, may together form a single divalent radical, and X and $Y_1$ or $Z_1$ may likewise together form a single divalent radical when X is a hydrocarbon, and $X_3$ and $Z_3$ may likewise together form a single divalent radical.

3. The process as defined by claim 2, said compound comprising at least one α-oxoamine group having one of the structural formulae:

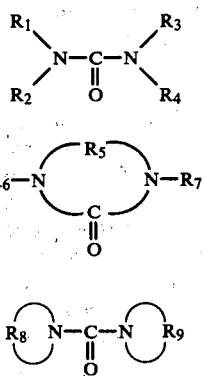

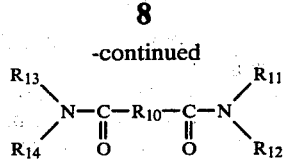

in which each $R_n$, where n = 1, 2, 3, 4, 5, 6, 7, 8, 9, 10, 11, 12, 13 or 14, is a hydrocarbon radical having from 1 to 10 carbon atoms.

4. The process as defined by claim 3, said compound comprising at least one α-oxoamine group being a tetraalkylurea or an N-substituted pyrrolidone.

5. The process as defined by claim 4, said tetraalkylurea or N-substituted pyrrolidone being tetramethylurea, tetraethylurea, tetrabutylurea, N-methylpyrrolidone or N-ethylpyrrolidone.

6. The process as defined by any of claims 2 to 5 or 1 the same being carried out in a reaction column, said halogenosilane being introduced into the base of said column, in liquid or gaseous form, into a zone having a temperature ranging from about −30° C. to about 200° C., with the compound comprising at least one α-oxoamine group being countercurrently circulated therein and being introduced into the top thereof, while maintaining a temperature gradient ranging from about −50° C. to about 200° C. in said column, and with the temperature at the top of the column being such that the products other than $SiH_4$ remain dissolved in the liquid phase, and recovering tetrahalogenosilane or an alkylhalogenosilane or arylhalogenosilane, residual halogenosilanes, and the compound comprising at least one α-oxoamine group from the base of the column.

7. The process as defined by claim 6, said compound comprising at least one α-oxoamine group being dissolved in an inert diluent therefor, and also recovering said diluent from the base of the column.

8. The process as defined by claim 1, said at least one halogenosilane comprising trichlorosilane, dichlorosilane, methyldichlorosilane, dimethylchlorosilane, phenyldichlorosilane or ethyldichlorosilane.

9. The process as defined by claim 1, the molar ratio of the α-oxoamine compound to the halogenosilane in the reaction mixture ranging from 2 to 1/50.

10. The process of claim 1, wherein the temperature employed for the separation ranges from −30° to 50° C.

* * * * *